(12) United States Patent
Park et al.

(10) Patent No.: US 10,834,756 B2
(45) Date of Patent: Nov. 10, 2020

(54) METHOD FOR ADJUSTING CONTENTION WINDOW SIZE IN WIRELESS COMMUNICATION SYSTEM SUPPORTING UNLICENSED BAND AND DEVICE FOR SUPPORTING SAME

(71) Applicant: LG Electronics Inc., Seoul (KR)

(72) Inventors: Hanjun Park, Seoul (KR); Seonwook Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 108 days.

(21) Appl. No.: 16/317,736

(22) PCT Filed: Jul. 14, 2017

(86) PCT No.: PCT/KR2017/007558
§ 371 (c)(1),
(2) Date: Jan. 14, 2019

(87) PCT Pub. No.: WO2018/012919
PCT Pub. Date: Jan. 18, 2018

(65) Prior Publication Data
US 2020/0045734 A1    Feb. 6, 2020

Related U.S. Application Data

(60) Provisional application No. 62/362,554, filed on Jul. 14, 2016.

(51) Int. Cl.
*H04W 74/08* (2009.01)
*H04L 1/18* (2006.01)
(Continued)

(52) U.S. Cl.
CPC ....... *H04W 74/0808* (2013.01); *H04L 1/1819* (2013.01); *H04W 16/14* (2013.01);
(Continued)

(58) Field of Classification Search
None
See application file for complete search history.

(56) References Cited

U.S. PATENT DOCUMENTS

2017/0019909 A1*  1/2017  Si .......................... H04W 76/28

FOREIGN PATENT DOCUMENTS

KR    1020160010848    1/2016
KR    1020160052420    5/2016
(Continued)

OTHER PUBLICATIONS

PCT International Search Report and Written Opinion in International Appln. No. PCT/KR2017/007558, dated Oct. 18, 2017, 16 pages (with English translation).
(Continued)

*Primary Examiner* — Huy D Vu
*Assistant Examiner* — Bao G Nguyen
(74) *Attorney, Agent, or Firm* — Fish & Richardson P.C.

(57) ABSTRACT

Disclosed in the present invention are: a method for controlling a contention window size (CWS) for uplink listen-before-talk (LBT) in a wireless communication system supporting an unlicensed band; and a device for supporting the same. More particularly, disclosed are a base station centric CWS controlling method, a terminal centric CWS controlling method, and devices for supporting the same.

20 Claims, 12 Drawing Sheets

(51) Int. Cl.
*H04W 16/14* (2009.01)
*H04W 72/04* (2009.01)
*H04W 72/14* (2009.01)

(52) U.S. Cl.
CPC ..... *H04W 72/042* (2013.01); *H04W 72/0446* (2013.01); *H04W 72/14* (2013.01)

(56) References Cited

FOREIGN PATENT DOCUMENTS

| WO | WO2014200951 | 12/2014 |
| WO | WO2015187285 | 12/2015 |

OTHER PUBLICATIONS

4G Americas, "LTE Aggregation & Unlicensed Spectrum," 3GPP PCG36_21, dated Apr. 11, 2016, 27 pages.

\* cited by examiner

METHOD FOR ADJUSTING CONTENTION WINDOW SIZE IN WIRELESS COMMUNICATION SYSTEM SUPPORTING UNLICENSED BAND AND DEVICE FOR SUPPORTING SAME

CROSS-REFERENCE TO RELATED APPLICATIONS

This application is a National Stage application under 35 U.S.C. § 371 of International Application No. PCT/KR2017/007558, filed on Jul. 14, 2017, which claims the benefit of U.S. Provisional Application No. 62/362,554, filed on Jul. 14, 2016. The disclosures of the prior applications are incorporated by reference in their entirety.

TECHNICAL FIELD

The following description relates to a wireless communication system supporting an unlicensed band, and more particularly, to a method of adjusting a contention window size (CWS) for uplink listen-before-talk (LBT) in a wireless communication system supporting an unlicensed band, and an apparatus supporting the same.

Specifically, the following description includes a description of a base station (BS)-based CWS adjustment method, a user equipment (UE)-based CWS adjustment method, and apparatuses supporting the methods

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

In addition, as more and more communication devices are required to have larger communication capacity, a proposal for the operation of each communication device in an unlicensed band that can be accessed based on competition is required.

DISCLOSURE

Technical Problem

An aspect of the present invention is to provide a method and apparatus for adjusting a contention window size (CWS) in the process of uplink listen-before-talk (LBT) of a user equipment (UE) to transmit an uplink signal in an unlicensed band in a wireless communication system supporting the unlicensed band.

Particularly, an aspect of the present invention is to provide a method and apparatus for adjusting a CWS for uplink LBT, when a base station (BS) does not provide hybrid automatic repeat request-acknowledgement (HARQ-ACK) information for each uplink subframe of an unlicensed band scheduled by the BS.

The technical objects that can be achieved through the present invention are not limited to what has been particularly described hereinabove and other technical objects not described herein will be more clearly understood by persons skilled in the art from the following detailed description.

Technical Solution

The present invention provides a method and apparatus for adjusting a contention window size (CWS) for uplink listen-before-talk by a user equipment (UE) in a wireless communication system supporting an unlicensed band.

In an aspect of the present disclosure, a method of adjusting a CWS for uplink LBT by a UE in a wireless communication system supporting an unlicensed band includes receiving a downlink control signal in a first subframe from a base station (BS), the downlink control signal indicating the position of a first successfully received subframe of an uplink signal transmitted in an unlicensed band within a predetermined number of subframes from the first subframe, or the absence of any successfully received subframe of the uplink signal, adjusting a CWS for uplink LBT on the basis of information indicated by the received downlink control signal, and the position of a first subframe in a latest uplink transmission burst transmitted in the unlicensed band by the UE, and performing uplink LBT for an uplink transmission in the unlicensed band on the basis of the adjusted CWS, and performing the uplink transmission in the unlicensed band on the basis of a result of the uplink LBT.

In another aspect of the present invention, a UE for adjusting a CWS for uplink LBT in a wireless communication system supporting an unlicensed band includes a transmitter, a receiver, and a processor operatively connected to the transmitter and the receiver. The processor is configured to receive a downlink control signal in a first subframe from a BS, the downlink control signal indicating the position of a first successfully received subframe of an uplink signal transmitted in an unlicensed band within a predetermined number of subframes from the first subframe, or the absence of any successfully received subframe of the uplink signal, to adjust a CWS for uplink LBT on the basis of information indicated by the received downlink control signal, and the position of a first subframe in a latest uplink transmission burst transmitted in the unlicensed band by the UE, and to perform uplink LBT for an uplink transmission in the unlicensed band on the basis of the adjusted CWS, and performing the uplink transmission in the unlicensed band on the basis of a result of the uplink LBT.

The downlink control signal may indicate the presence or absence of any successfully received subframe of the uplink signal transmitted in the unlicensed band within the predetermined number of subframes from the first subframe by information of one of M bits (M is a natural number larger than 1). In the presence of any successfully received subframe of the uplink signal transmitted in the unlicensed band within the predetermined number of subframes from the first subframe, the position of the first successfully received subframe of the uplink signal transmitted in the unlicensed band within the predetermined number of subframes from the first subframe may be indicated by information of (M−1) bits out of the M bits.

In a specific example, in the presence of any successfully received subframe of the uplink signal transmitted in the unlicensed band within the predetermined number of subframes from the first subframe, the downlink control signal may indicate a value obtained by applying a modulo operation to an index of the first successfully received subframe of the uplink signal transmitted in the unlicensed band within the predetermined number of subframes from the first subframe by the information of the (M−1) bits out of the M bits.

Further, in the absence of any successfully received subframe of the uplink signal transmitted in the unlicensed band within the predetermined number of subframes from the first subframe, the adjustment of a CWS for uplink LBT may include increasing the CWS for the uplink LBT.

Further, in the presence of any successfully received subframe of the uplink signal transmitted in the unlicensed band within the predetermined number of subframes from the first subframe, the adjustment of a CWS for uplink LBT may include, if the first successfully received subframe of the uplink signal transmitted in the unlicensed band within the predetermined number of subframes from the first subframe is identical to the first subframe in the latest uplink transmission burst transmitted in the unlicensed band by the UE, resetting the CWS for the uplink LBT, and if the first successfully received subframe of the uplink signal transmitted in the unlicensed band within the predetermined number of subframes from the first subframe is different from the first subframe in the latest uplink transmission burst transmitted in the unlicensed band by the UE, increasing the CWS for the uplink LBT.

Further, in the absence of any successfully received subframe of the uplink signal transmitted in the unlicensed band within the predetermined number of subframes from the first subframe, the adjustment of a CWS for uplink LBT may include, if there is no uplink transmission burst transmitted in the unlicensed band within the predetermined number of subframes from the first subframe by the UE, and a retransmission for a hybrid automatic repeat request (HARQ) process identifier (ID) applied to the first subframe in the latest uplink transmission burst transmitted in the unlicensed band by the UE is indicated to the UE, increasing the CWS for the uplink LBT, and if there is no uplink transmission burst transmitted in the unlicensed band within the predetermined number of subframes from the first subframe by the UE, and an initial transmission for the HARQ process ID applied to the first subframe in the latest uplink transmission burst transmitted in the unlicensed band by the UE is indicated to the UE, resetting the CWS for the uplink LBT.

The retransmission or the initial transmission for the HARQ process ID may be indicated by a new data indicator (NDI). Further, the NDI may be included in the downlink control signal.

Further, the adjustment of a CWS for uplink LBT may include resetting the CWS for the uplink LBT to a minimum of CWSs included in a preset CWS set, or increasing the CWS to a next larger CWS in the preset CWS set.

The downlink control signal may be a downlink control signal for a downlink assignment or an uplink grant.

In addition, the present invention provides a method and apparatus for adjusting a CWS for uplink LBT by a BS in a wireless communication system supporting an unlicensed band.

It is to be understood that both the foregoing general description and the following detailed description of the present invention are exemplary and explanatory and are intended to provide further explanation of the invention as claimed.

Advantageous Effects

As is apparent from the above description, the embodiments of the present disclosure have the following effects.

According to the present invention, a user equipment (UE) may adjust a contention window size (CWS) for uplink listen-before-talk (LBT) with low signaling overhead.

Particularly, in view of the nature of occasional transmissions, the UE is easily aware of the position of a subframe in which the UE actually starts to transmit an uplink transmission burst, compared to a base station (BS). Thus, the UE may easily adjust a CWS for uplink LBT, using information received from the BS (e.g., the position of the first successfully received subframe within a predetermined number of subframes from a reception time, or the like).

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. Reference numerals in each drawing refer to structural elements.

BEST MODE FOR CARRYING OUT THE INVENTION

Figure 1:
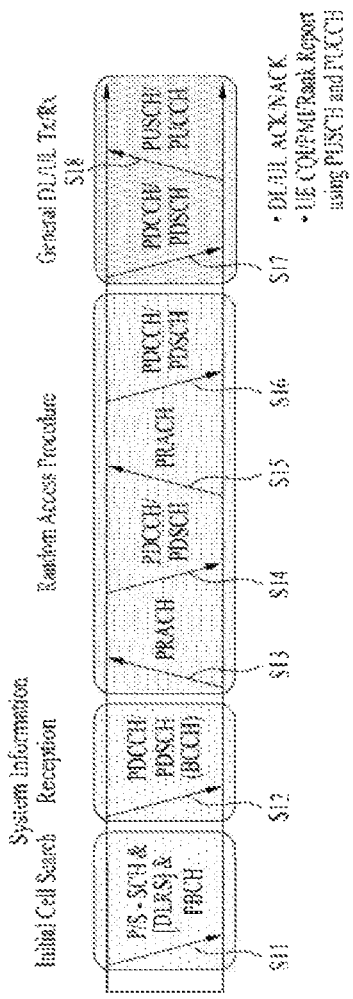
FIG. 1 is a diagram illustrating physical channels and a signal transmission method using the physical channels.

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
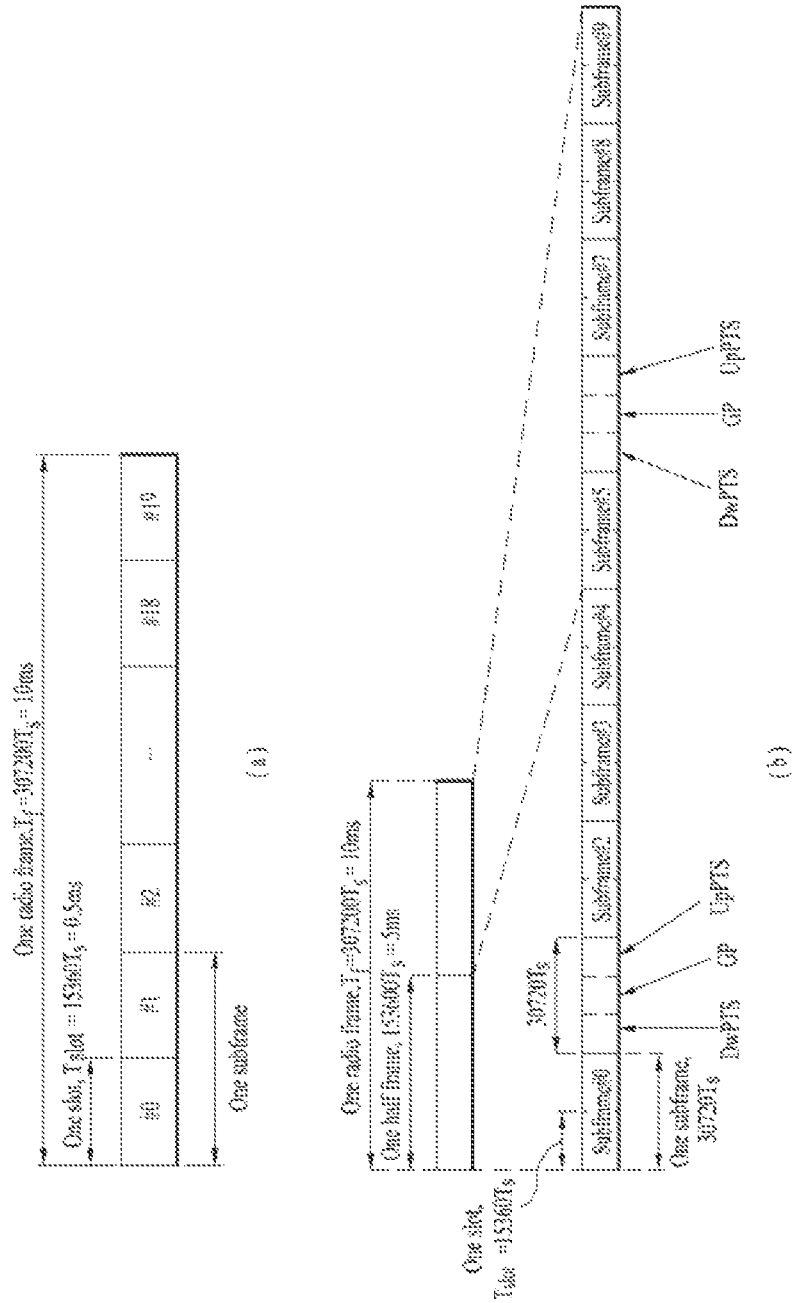
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f$=307200·$T_s$) long, including equal-sized 20 slots indexed from 0 to 19. Each slot is 0.5 ms ($T_{slot}$=15360·$T_s$) long. One subframe includes two successive slots. An ith subframe includes 2ith and (2i+1)th slots. That is, a radio frame includes 10 subframes. A time required for transmitting one subframe is defined as a Transmission Time Interval (TTI). $T_s$ is a sampling time given as $T_s$=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An ith subframe includes 2ith and (2i+1)th slots each having a length of 0.5 ms ($T_{slot}$=15360·$T_s$). $T_s$ is a sampling time given as $T_s$=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
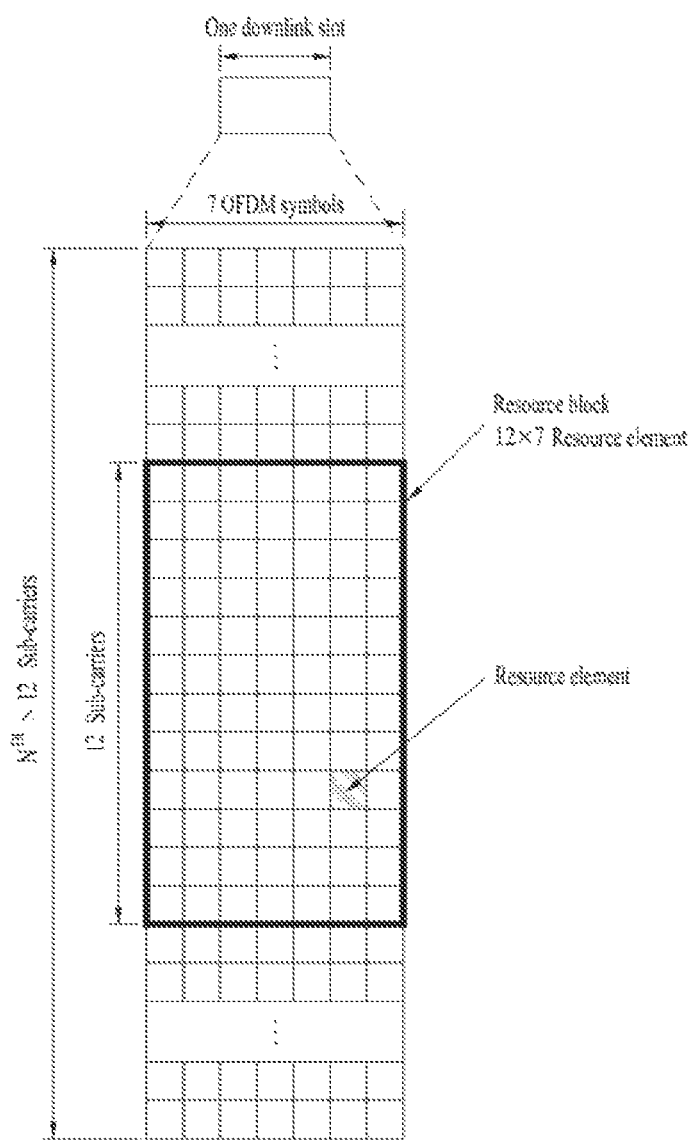
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
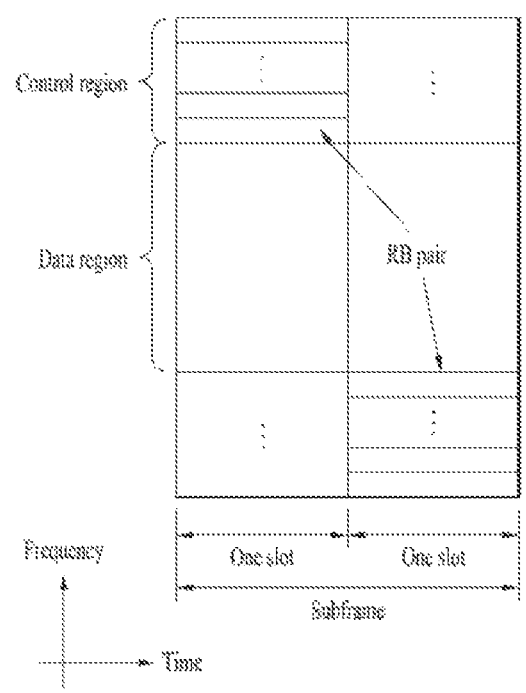
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
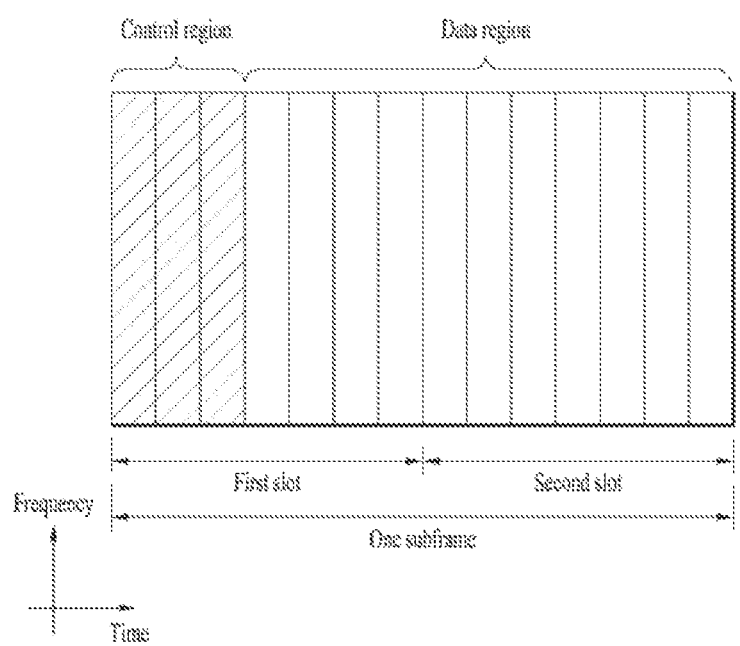
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. LTE-U System 2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
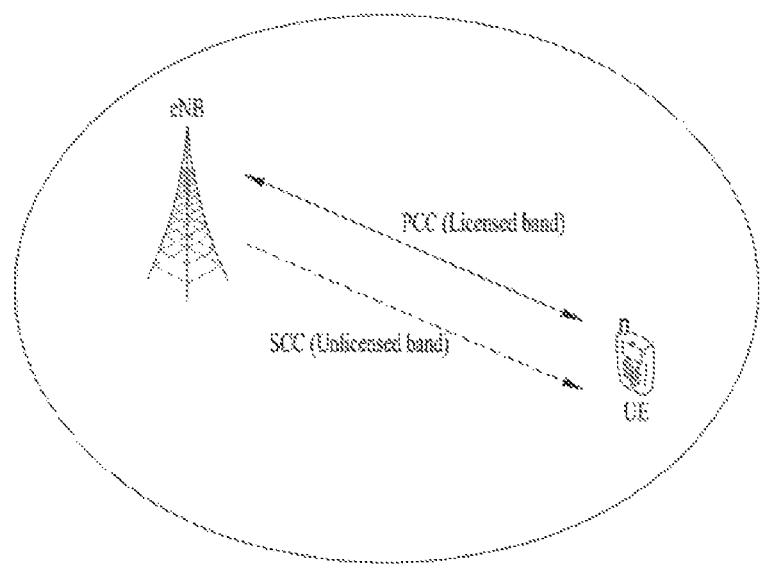
FIG. 6 is a diagram illustrating an exemplary carrier aggregation (CA) environment supported by a long term evolution in unlicensed spectrum (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
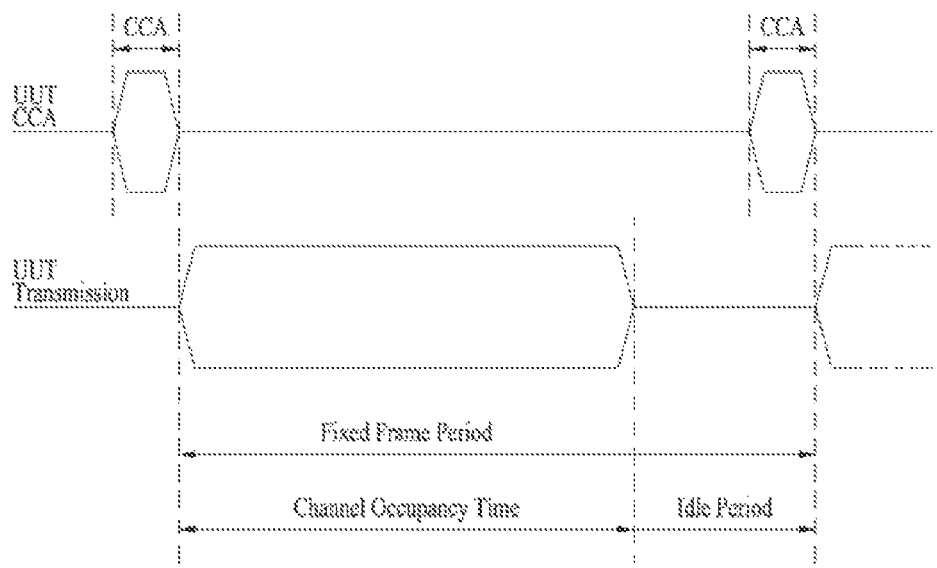
FIG. 7 is a diagram illustrating an exemplary frame based equipment (FBE) operation as a listen-before-talk (LBT) process.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
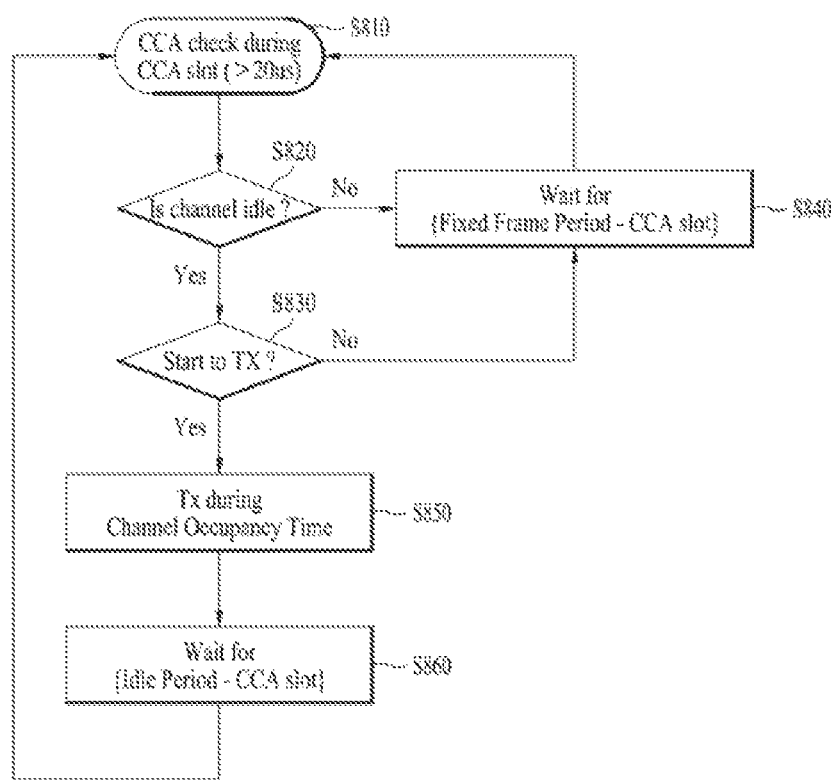
FIG. 8 is a block diagram illustrating an FBE operation.

FIG. 8 is a block diagram illustrating the FBE operation.

Referring to FIG. 8, a communication node (i.e., eNB) managing an SCell performs CCA during a CCA slot [S810]. If the channel is idle [S820], the communication node performs data transmission (Tx) [S830]. If the channel is busy, the communication node waits for a time period calculated by subtracting the CCA slot from a fixed frame period, and then resumes CCA [S840].

The communication node transmits data during the channel occupancy time [S850]. Upon completion of the data transmission, the communication node waits for a time period calculated by subtracting the CCA slot from the idle period [S860], and then resumes CCA [S810]. If the channel is idle but the communication node has no transmission data, the communication node waits for the time period calculated by subtracting the CCA slot from the fixed frame period [S840], and then resumes CCA [S810].

Figure 9:
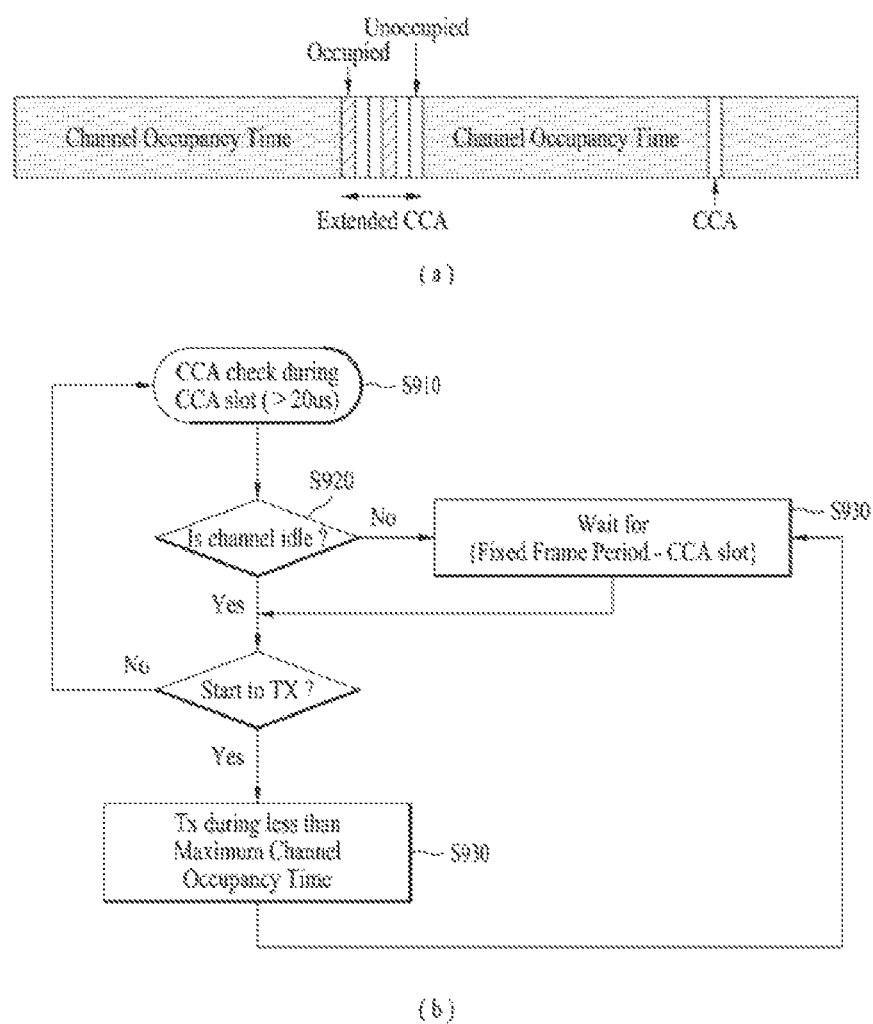
FIG. 9 is a diagram illustrating an exemplary load based equipment (LBE) operation as a listen-before-talk (LBT) process.

FIG. 9 is a view illustrating an exemplary LBE operation as one of the LBT operations.

Referring to FIG. 9(a), in LBE, the communication node first sets q (q $\in$ {4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot [S910]. If the channel is unoccupied in a first CCA slot [S920], the communication node may transmit data by securing a time period of up to (13/32)q ms [S930].

On the contrary, if the channel is occupied in the first CCA slot, the communication node selects N (N$\in$ {1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S940].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
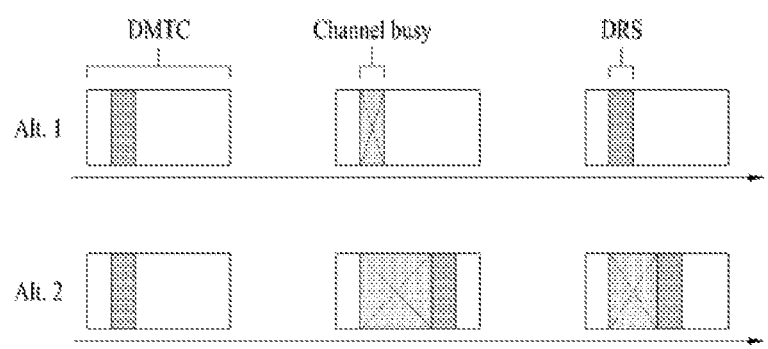
FIG. 10 is a diagram illustrating methods of transmitting a discovery reference signal (DRS) supported by a licensed assisted access (LAA) system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
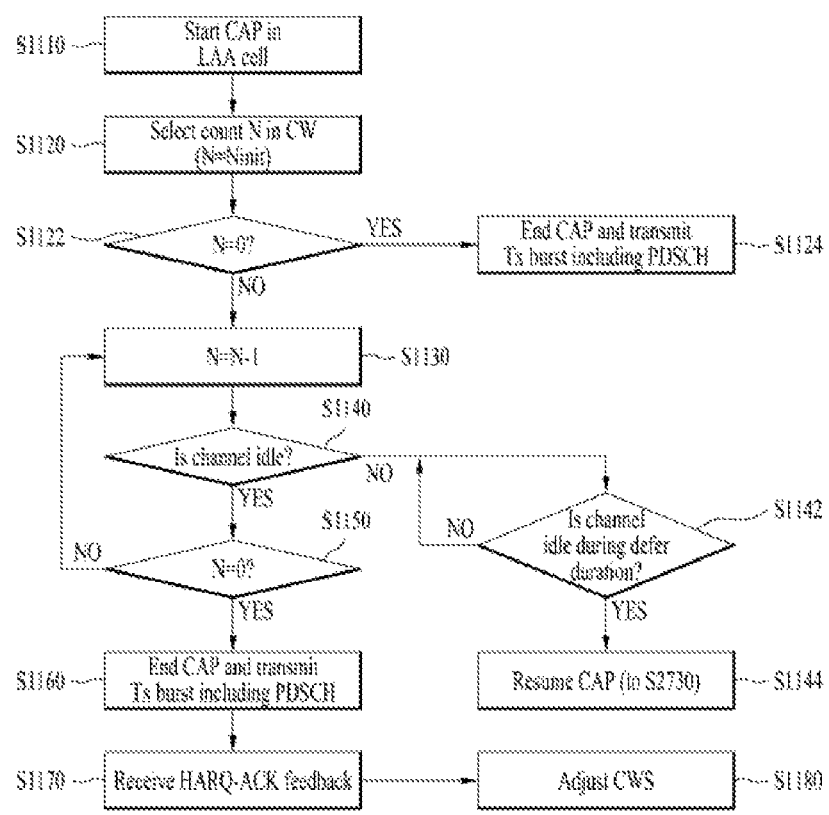
FIG. 11 is a diagram referred to for describing a channel access procedure (CAP) and contention window adjustment (CWA).

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to CWp.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [51144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [51170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

2.6. Channel Access Priory Class

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

Similarly to the afore-described DL case, a method of applying, as a UL LBT operation, single CCA slot-based LBT (or one-shot LBT) in which a UE transmits a UL signal (e.g., a PUCCH) by monitoring only a 25 μs long CCA slot, and category 4 LBT (or Cat. 4 LBT) in which LBT parameters defined as 4 LBT priority classes as listed in Table 3 are under consideration, in an enhanced LAA (eLAA) system of LTE Rel-14 to which the present invention is applicable. Table 3 sequentially lists the length of a defer period, a minimum/maximum contention window size (CWS), a maximum channel occupancy time (MCOT), and a CWS set for each LBT priority class, column by column.

TABLE 3

| LBT priority class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms (see note 1) or 10 ms (see note 2) | {15, 31, 63, 127, 255, 511, 1023} |
| 4 | 7 | 15 | 1023 | 6 ms (see note 1) or 10 ms (see note 2) | {15, 31, 63, 127, 255, 511, 1023} |

NOTE 1:
The MCOT of 6 ms may be increased to 8 ms by inserting one or more gaps. The minimum duration of a pause shall be 100 μs The maximum duration (Channel Occupancy) before including any such gap shall be 6 ms. The gap duration is not included in the channel occupancy time.
NOTE 2:
If the absence of any other technology sharing the carrier can be guaranteed on a long term basis (e.g. by level of regulation), the maximum channel occupancy time (MCOT) for LBT priority classes 3 and 4 is for 10 ms, otherwise, the MCOT for LBT priority classes 3 and 4 is 6 ms as in note 1.

2.7. Subframe Structure Applicable to LAA System

Figure 12:
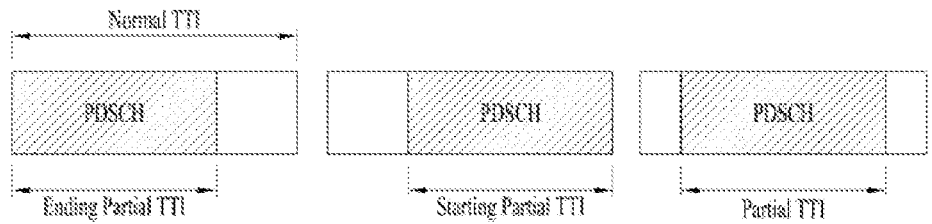
FIG. 12 is a diagram illustrating a partial transmission time interval (TTI) or a partial subframe, which is applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

3. Proposed Embodiments

Based on the above-described technical idea, the present invention proposes a method of adjusting a CWS for UL LBT, when an eNB or a UE performs an LBT-based signal transmission in a wireless communication system supporting an unlicensed band.

If random backoff-based LBT (e.g., Cat. 4 LBT) is applied to an unlicensed band, a method of adjusting a CWS according to whether a signal transmission collides with another signal transmission may be performed. For example, when an eNB performs DL Cat. 4 LBT in an LTE Rel-13 LAA system, if the decoding result of the first transmitted subframe within a latest DL transmission (TX) burst transmitted by the eNB is ACK, the eNB may reset a current CWS to a minimum value (e.g., CWmin), determining that no collision has occurred. If the decoding result is NACK, the eNB may increase the current CWS to the next larger CWS in a preset CWS set, determining that collision has occurred. This operation is based on the assumption that when the eNB transmits a TX Burst after successfully performing an LBT operation, it may be determined that NACK for the first transmitted subframe is attributed to simultaneous transmissions of different nodes.

With the same reasoning, a process of adjusting a CWS according to the decoding result of the first transmitted subframe within a latest UL TX Burst transmitted by a UE may also be considered in UL Cat. 4 LBT. In the LTE Rel-14 system, however, (asynchronous) HARQ is adopted to support an occasional UL transmission in LAA. When an eNB indicates UL scheduling for a specific HARQ process to a UE, the eNB simply indicates whether the transmission is an initial transmission or a retransmission, without supporting a legacy operation of transmitting HARQ-ACK information (e.g., ACK, NACK, or discontinuous transmission (DTX)) per scheduled UL subframe on a physical HARQ indicator channel (PHICH). Therefore, the UE does not have accurate knowledge of the decoding result of the first transmitted subframe within the latest UL TX Burst that the UE has transmitted in the UL Cat. 4 LBT process. In this context, there is a need for considering a CWS adjustment method, aside from the DL Cat. 4 LBT process.

Thus, the present invention provides a method of adjusting a CWS, applicable to a UL Cat. LBT process. Specifically, the CWS adjustment method will be described in detail, separately in both cases in which an eNB is responsible for adjusting a CWS, and a UE is responsible for adjusting a CWS.

In the present invention, if the decoding result of a specific subframe is ACK (or NACK), this may generally imply that ACK (or NACK) exists for a predetermined or larger proportion of transport blocks (TB s) transmitted in the subframe.

3.1. eNB-Based CWS Adjustment Method 3.1.1. First eNB-Based CWS Adjustment Method When the UE transmits a UL TX Burst according to an LBT operation, the UE may transmit a preamble (e.g., a demodulation reference signal (DM-RS)) or a sounding reference signal (SRS) in the last symbol of a subframe previous to the first transmission subframe of the UL TX Burst.

If the UE performs a transmission in the first subframe of the UL TX Burst from the perspective of scheduling, the UE may not transmit the DM-RS or the SRS in the subframe previous to the first subframe.

Or, regarding a subframe having a last symbol in which SRS transmission is triggered, the UE may transmit the preamble in the last symbol, ignoring the SRS triggering. For example, if the DM-RS is used as the preamble, even though SRS transmission in the last symbol of the subframe previous to the first subframe of the UL TX Burst is triggered, the UE may transmit the DM-RS in the last symbol, ignoring the SRS triggering.

In this case, the eNB may indicate CWS adjustment to the UE on the basis of a latest scheduled UL TX Burst (in other words, a set of contiguous subframe(s)) by a UL grant (or DL grant) in the following manner.

(1) In the absence of any subframe for which ACK has been determined (within the UL TX Burst), the eNB indicates CWS increase to the UE (or the eNB indicates autonomous CWS adjustment to the UE).

(2) In the presence of any subframe for which ACK has been determined (within the UL TX Burst), (A) If the first subframe for which ACK has been determined is the first scheduled subframe, the eNB indicates CWS reset, or (B) If the decoding result of a subframe that the eNB has determined to be the first transmission subframe is ACK, the eNB indicates CWS reset, and if the decoding result is NACK, the eNB indicates CWS increase.

Particularly, upon detection of a preamble in the last symbol of a subframe previous to the first subframe for which ACK has been determined in (B), the eNB may indicate CWS reset, and otherwise, the eNB may indicate CWS increase.

Herein, the DM-RS resource (e.g., a sequence or time and frequency resources) may be the same as a DM-RS resource in the first transmission subframe of the UL TX Burst.

Further, the eNB may pre-configure an SRS resource (e.g., a sequence or time and frequency resources) for the UE by higher-layer signaling (or a dynamic control signal).

Further, in the case where the eNB indicates CWS increase or autonomous CWS adjustment to the UE, if the UE fails in transmitting all subframes within a latest UL TX Burst scheduled by the eNB, the UE may maintain a CWS, and otherwise, the UE may increase the CWS.

More specifically, in order to adjust a CWS for a UL Cat. 4 LBT operation, the eNB should be able to detect the latest UL TX Burst transmitted by the UE, and the first transmission subframe of the UL TX Burst.

However, even though the UE actually transmits a PUSCH or the like in a specific UL subframe, it may occur in some cases that the eNB fails to detect a DM-RS corresponding to the PUSCH. Then, the eNB may determine a wrong position of the first transmission subframe of the UL TX Burst transmitted by the UE.

For example, even though the UE has performed a transmission in an $n^{th}$ subframe for a specific UL TX Burst, the eNB may succeed in detecting a DM-RS in an $(n+1)^{th}$ subframe from the perspective of scheduling, and thus determine the $(n+1)^{th}$ subframe to be the first transmission subframe of the UL TX Burst. Moreover, upon detection of ACK for the $(n+1)^{th}$ subframe from the perspective of scheduling, the eNB may indicate CWS reset, determining that no collision has occurred. However, since the eNB has failed in decoding the actual first transmission subframe (the $n^{th}$ subframe in the above example), it is highly likely that collision has occurred.

As such, when the eNB erroneously determines NACK/DTX for the first transmission subframe of the latest UL TX Burst transmitted by the UE to be ACK, the signal collision problem may become serious. Accordingly, it is to be designed that CWS adjustment should not be performed in the above case.

On the contrary, when the eNB erroneously determines ACK for the first transmission subframe of the latest UL TX Burst transmitted by the UE to be NACK/DTX, the use of a conservative CWS adjustment scheme may be more or less unfavorable in terms of channel occupancy, but without worsening the signal collision problem. Therefore, this operation may be allowed exceptionally.

In this context, the present invention proposes a method of determining ACK or NACK for the first transmission subframe of a latest UL TX Burst from the perspective of scheduling by an eNB, and transmitting a preamble in the symbol immediately previous to the first transmission subframe by a UE in order to decrease the probability of the eNB's wrong decision on the first transmission subframe.

In the absence of any subframe for which ACK has been determined within the UL TX Burst, the eNB may indicate CWS increase, considering that the absence of any subframe corresponding to ACK is caused by collision from a conservative point of view, although it is probable that the UE has failed in the transmission in view of UL grant missing. Or, if there is any subframe for which ACK has been determined within the UL TX Burst, and the earliest of subframes for which ACK has been determined is the first scheduled subframe, a CWS is reset. However, if there is any subframe for which ACK has been determined within the UL TX Burst, and the earliest of the subframes for which ACK has been determined is not the first scheduled subframe, the CWS may be increased or reset depending on whether a preamble has been detected in the symbol immediately previous to the subframe. Specifically, it is determined whether the subframe is the first transmission subframe depending on whether the preamble has been detected in the symbol immediately previous to the subframe. If it is determined that the subframe is the first transmission subframe, the CWS may be reset, and otherwise, the CWS may be increased.

Figure 13:
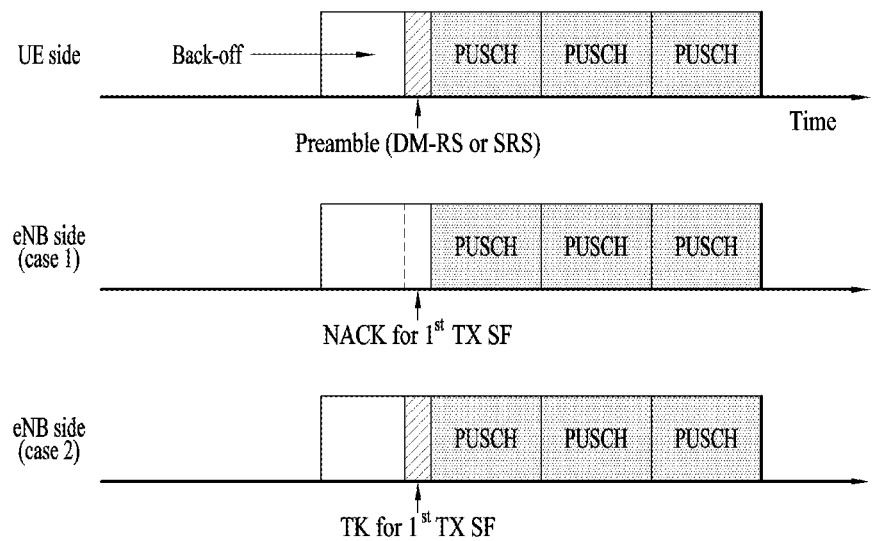
FIG. 13 is a diagram illustrating an operation of, when an evolved Node B (eNB) schedules an uplink transmission burst (UL TX Burst) including four subframes, transmitting a preamble in a previous symbol and starting to attempt a transmission in the second subframe of the UL TX Burst by a user equipment (UE).

FIG. 13 illustrates an operation of a UE for, when an eNB schedules a UL TX Burst including four subframes, transmitting a preamble in a previous symbol, while starting to attempt to transmit a signal in the second subframe of the UL TX Burst.

As illustrated in FIG. 13, on the eNB side (case 1), if the eNB fails to detect a preamble, the eNB may increase a CWS, determining NACK for the first transmission subframe (of the UL TX Burst). Or, on the eNB side (case 2), since the eNB successfully detects the preamble, the eNB may adjust the CWS according to the decoding result of a PUSCH transmitted in a UL subframe immediately following the preamble, determining the UL subframe to be the first transmission subframe (of the UL TX Burst). (That is, if the decoding result is ACK, the CWS is reset, and if the decoding result is NACK, the CWS is increased).

3.1.2. Second eNB-Based CWS Adjustment Method

When the UE transmits a UL TX Burst according to an LBT operation, the UE may select one of two types of DM-RS sequences (e.g., DM-RS Type A and DM-RS Type B), and transmit the selected DM-RS sequence. More specifically, the UE may transmit a DM-RS to which a DM-RS sequence of DM-RS Type A is applied in the first transmission subframe of the UL TX Burst, and a DM-RS to which a DM-RS sequence of DM-RS Type B is applied in any other subframe of the UL TX Burst.

When the UE transmits DM-RSs in the above manner, the eNB may indicate the following CWS adjustment based on a latest scheduled UL TX Burst (e.g., a set of contiguous subframe(s)) to the UE by a UL grant (or DL grant).

(1) In the absence of any subframe for which ACK has been determined (in the UL TX Burst), CWS increase is indicated (or autonomous CWS adjustment is indicated to the UE).

(2) In the presence of any subframe for which ACK has been determined (in the UL TX Burst), 1) If the first subframe for which ACK has been determined is the first scheduled subframe, CWS reset is indicated.

2) If a DM-RS in the first subframe for which ACK has been determined is identified as of DM-RS Type A, CWS reset is indicated.

3) If the DM-RS in the first subframe for which ACK has been determined is identified as of DM-RS Type B, CWS increase is indicated.

DM-RS Type B may refer to a DM-RS sequence for a normal operation, whereas DM-RS Type A may refer to a DM-RS sequence that the eNB configures separately by higher-layer signaling (or a dynamic control signal).

Further, a sequence of DM-RS Type A and a sequence of DM-RS Type B may be identical, except that the sequences are distinguished from each other by different transmission comb indexes in different frequency resources (e.g., interleaved frequency division multiple access (IFDMA)).

Further, in the case where the eNB indicates CWS increase or autonomous CWS adjustment to the UE, if the UE fails in transmitting all subframes within a latest scheduled UL TX Burst, the UE may maintain the CWS, and otherwise, the UE may increase the CWS.

More specifically, compared to the forgoing first eNB-based CWS adjustment method, the UE may change a DM-RS sequence in a subframe in order to indicate to the eNB whether the subframe is the first transmission subframe of a specific UL TX Burst.

According to the foregoing first eNB-based CWS adjustment method, the eNB determines whether a specific subframe is the first transmission subframe of a UL TX Burst transmitted by the UE, solely by checking whether a preamble has been detected. Therefore, if the eNB fails in detecting the preamble, the eNB may increase a CWS, determining that the eNB has missed the first transmission subframe (i.e., DTX). If the detection probability of a preamble is low, the eNB may frequently increase a CWS in a too conservative strategy, thereby decreasing the channel access probability of the UE.

Meanwhile, in the case where the UE applies a preset DM-RS other than a legacy DM-RS to the first transmission subframe, if the eNB determines ACK for at least the first transmission subframe (of the UL TX Burst), the eNB may identify the DM-RS actually applied to the subframe with a very high probability. This operation may increase reliability, compared to the operation of identifying the first transmission subframe of a UL TX Burst by using a preamble.

Accordingly, the present invention proposes the following operation. The UE transmits a subframe with a different DM-RS type (e.g., DM-RS sequence) depending on whether the subframe is the first transmission subframe of a UL TX Burst. In correspondence with the operation of the UE, in the absence of any subframe for which ACK has been determined within a latest UL TX Burst from the perspective of scheduling, the eNB increases a CWS. On the contrary, in the presence of any subframe for which ACK has been determined within the UL TX Burst, if the earliest of subframes for which ACK has been determined is the first scheduled subframe, or a DM-RS applied to the subframe is a DM-RS sequence for the first transmission subframe, the eNB resets the CWS, and otherwise, the eNB increases the CWS.

Figure 14:
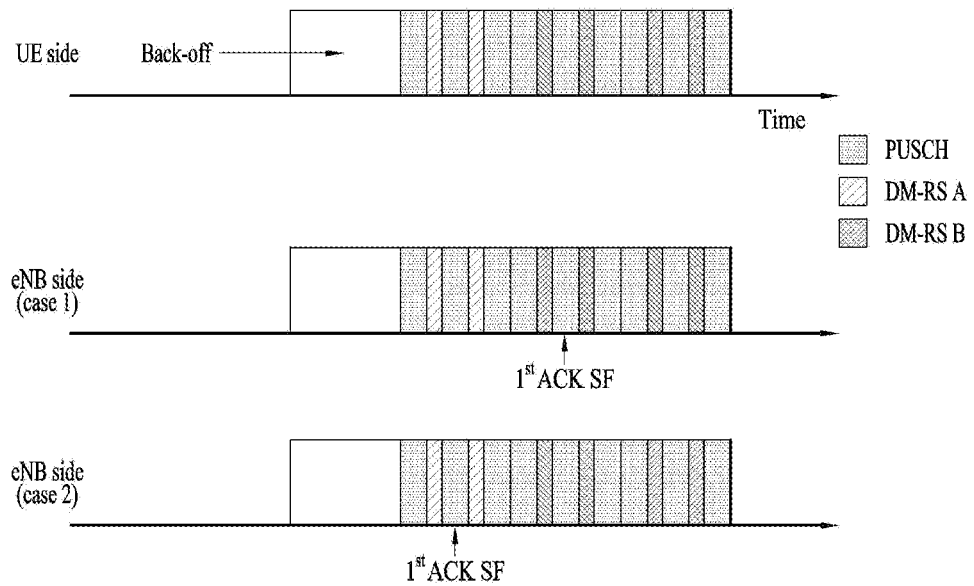
FIG. 14 is a diagram illustrating an operation of, when an eNB schedules a UL TX Burst including four subframes, starting to attempt a transmission in the second subframe of the UL TX Burst by applying different demodulation reference signal (DM-RS) types by a UE.

FIG. 14 is a diagram illustrating an operation of a UE for, when an eNB schedules a UL TX Burst including four subframes, applying a different DM-RS type, while starting to attempt transmission in a second subframe of the UL TX burst.

As illustrated in FIG. 14, on the eNB side (case 1), since a DM-RS in the first subframe for which ACK has been detected (the first ACK subframe) is identified as a normal DM-RS (e.g., DM-RS Type B) other than a DM-RS (e.g., DM-RS Type A) for the first transmission subframe, the eNB may increase a CWS, determining NACK for the first transmission frame (within the UL TX Burst) transmitted by the UE.

Meanwhile, on the eNB side (case 2), the eNB identifies the DM-RS detected in the first ACK subframe as the DM-RS (e.g., DM-RS Type A) for the first transmission subframe. Thus, the eNB may reset the CWS, determining that the eNB has succeeded in PUSCH decoding in the first transmission subframe (within the UL TX Burst) transmitted by the UE.

3.2. UE-Based CWS Adjustment Method 3.2.1. First UE-Based CWS Adjustment Method

If the eNB adjusts a CWS on the basis of a latest received UL TX Burst (e.g., a latest received set of contiguous subframe(s)), and indicates a CWS to be applied to the UE by a UL grant (or DL grant), the UE may adjust a CWS based on the CWS information indicated by the eNB.

(1) If a retransmission for an HARQ process ID applied to the first transmission subframe of a latest transmitted UL TX Burst is indicated to the UE, the UE increases a CWS for the next UL TX Burst transmission irrespective of the CWS indication of the eNB.

(2) If an initial transmission for the HARQ process ID applied to the first transmission subframe of the latest transmitted UL TX Burst is indicated to the UE, the UE resets (or maintains) the CWS for the next UL TX Burst transmission irrespective of the CWS indication of the eNB.

(3) Else, the UE sets a CWS as indicated by the eNB.

Specifically, when the eNB adjusts a CWS, the eNB may autonomously determine a latest UL TX Burst transmitted by the UE and the first transmission subframe of the UL TX Burst, and then indicate a CWSS adjusted on the basis of the decoding result of the subframe to the UE. In this case, it may occur that the eNB wrongly determines the first transmission subframe of the UL TX Burst. If the UE is capable of deriving the decoding result of the first transmission subframe of the latest UL TX Burst transmitted by the UE, using a new data indicator (NDI) or the like, the UE may autonomously adjust a CWS without just applying the wrong CWS signaling of the eNB.

For example, if an NDI for an HARQ process ID applied to the first transmission subframe of the latest UL TX Burst transmitted by the UE indicates a retransmission before the UE receives CWS signaling from the eNB, the UE may determine NACK for the subframe, and then increase the existing CWS for the next UL TX Burst to be transmitted, irrespective of the CWS signaling of the eNB. In the above case, if the NDI indicates an initial transmission, the UE may reset the CWS, determining ACK for the subframe. However, since the eNB is likely to indicate an initial transmission in spite of not ACK, the UE may conservatively maintain the CWS.

3.2.2. Second UE-Based CWS Adjustment Method

The eNB may transmit the following information to the UE, regarding $2^L$ states representable in L bits of a UL grant (or DL grant) on the basis of a latest scheduled UL TX Burst (e.g., a set of contiguous subframe(s)).

(1) If the index of the first subframe for which ACK has been detected (within the UL TX Burst) is K, some states indicate a value M obtained by applying a modulo-P operation to K (M=K mod P).

(2) One state indicates the presence or absence of any subframe for which ACK has been detected (within the UL TX Burst).

Thus, the UE may adjust a CWS based on information indicated in L bits by the eNB, as follows.

1) If the eNB indicates the absence of any subframe for which ACK has been detected (within the UL TX Burst) in L bits, the UE increases the CWS. However, if the UE fails in transmitting all subframes of a latest UL TX Burst scheduled by the eNB, the UE may maintain the CWS.

2) If the eNB indicates a value M obtained by applying a modulo-P operation to K (M=K mod P) where K is the index of the first subframe for which ACK has been detected (within the UL TX Burst) by L bits, the UE assumes the index K' of an earliest subframe resulting in M among the indexes of subframes transmitted in the latest transmitted (or scheduled) UL TX Burst to be an estimate of the subframe index K, and operate as follows.

A) If the index of the first transmission subframe of the latest transmitted UL TX Burst is identical to K', the CWS is reset.

B) If the index of the first transmission subframe of the latest transmitted UL TX Burst is different from K', the CWS is increased.

Herein, it may be configured that $P=2^L-1$.

Specifically, when a CWS adjustment process is performed according to the decoding result of the first subframe transmitted in the latest UL TX Burst transmitted by the UE in a UL Cat. 4 LBT process, the UE is capable of accurately determining the first transmission subframe of the latest UL TX Burst. Therefore, the UE has an advantage over the eNB in CWS adjustment. However, since the eNB determines the decoding result of the first transmission subframe within the UL TX Burst, the UE should receive the information from the eNB. If the eNB notifies the UE of the HARQ-ACK (including DTX) results of all UL subframes or all PUSCHs transmitted by the UE, the UE may easily adjust a CWS on the basis of the HARQ-ACK result of the first transmission subframe of the latest UL TX Burst. However, in LAA characterized by occasional transmissions, the operation of transmitting to the UE the HARQ-ACK (including DTX)

results of all UL subframes (or all PUSCH transmissions) transmitted by the UE at the eNB may cause too much signaling overhead.

Therefore, the present invention proposes a method of indicating the index of the first subframe for which ACK has been detected in a latest UL TX Burst from the perspective of scheduling to a UE by a UL grant (or DL grant) by an eNB, and determining whether the eNB is aware of the first transmission subframe of the UL Tx Burst and whether the eNB has detected ACK for the subframe on the basis of the information by the UE.

First, the eNB may indicate to the UE that ACK has been detected for none of subframes within a latest UL TX Burst from the perspective of scheduling by a UL grant (or DL grant). Or, in the presence of any subframe for which ACK has been detected within the latest UL TX Burst, the eNB may indicate to the UE a value obtained by performing a specific modulo operation on the index of the first subframe for which ACK has been detected by a UL grant (or DL grant).

In correspondence with the above operation, if the eNB indicates to the UE the absence of any subframe for which ACK has been detected (within the UL TX Burst), the UE may increase a CWS. If the eNB indicates to the UE a value M obtained by performing a specific modulo operation on the index of a subframe for which ACK has been detected, the UE may determine the first subframe for which the eNB has detected ACK to be an earliest subframe that results in M as a value obtained by performing the modulo-P operation on a subframe index, among the indexes of subframes transmitted in a latest transmitted UL TX Burst. If the subframe is the first transmission subframe (within the UL TX Burst), the UE may reset the CWS, and if the subframe is not the first transmission subframe, the UE may increase the CWS.

Figure 15:
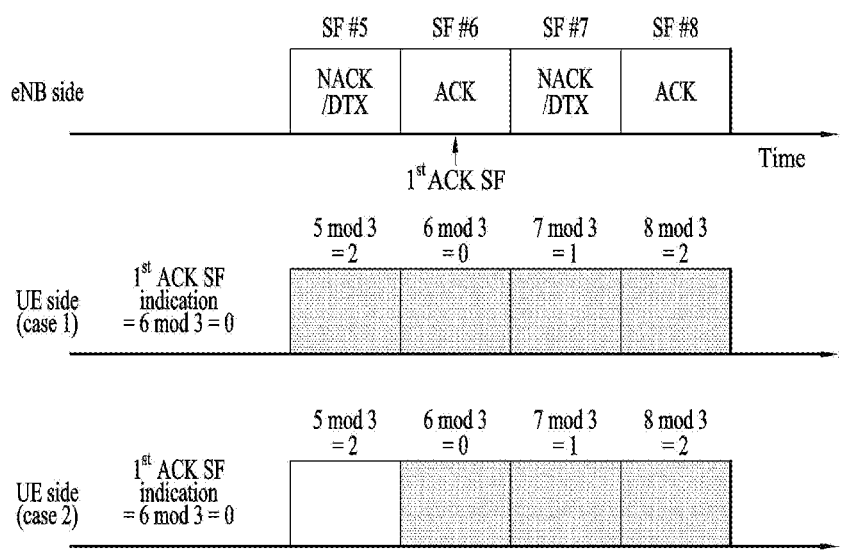
FIG. 15 is a diagram illustrating an operation of, when an eNB schedules a UL TX Burst including four subframes, detecting ACK for the second subframe of the UL TX Burst, and indicating a value obtained by applying a modulo-3 operation to the subframe index of the subframe (e.g., 6 mod 3=0) to a UE.

FIG. 15 is a diagram illustrating an operation of, when an eNB schedules a UL TX Burst including four subframes, detecting ACK for a second subframe within the UL TX Burst, and indicating a value (e.g., 6 mod 3=0) obtained by performing a modulo-3 operation on the index of the subframe to a UE by the eNB.

As illustrated in FIG. 15, on the UE side (case 1), the UE may start to perform a transmission in the first subframe of a UL TX Burst from the perspective of scheduling, that is, SF #5. Herein, the UE assumes an earliest subframe SF #16 with an index on which a modulo-3 operation results in 0 among the indexes of subframes transmitted (within a latest UL TX Burst) by the UE to be the first subframe for which the eNB has detected ACK, and increase a CWS, determining that the eNB has failed in detecting SF #5.

Meanwhile, on the UE side (case 2), the UE may start to perform a transmission in the second subframe of a UL TX Burst from the perspective of scheduling, that is, SF #6. Herein, the UE assumes an earliest subframe SF #16 with an index on which a modulo-3 operation results in 0 among the indexes of subframes transmitted (within a latest UL TX Burst) by the UE to be the first subframe for which the eNB has detected ACK. Since the subframe is identical to the first transmission subframe transmitted by the UE, the UE may reset the CWS, determining that the eNB has detected ACK for the first transmission subframe.

3.2.3. Third UE-Based CWS Adjustment Method

As in the afore-described second UE-based CWS adjustment method, the eNB may transmit the following information to the UE with $2^L$ states representable in L bits of a UL grant (or DL grant) on the basis of a latest scheduled UL TX Burst (e.g., a set of contiguous subframe(s)).

(1) If the index of the first subframe for which ACK has been detected (within the UL TX Burst) is K, some states indicate a value M obtained by applying a modulo-P operation to K (M=K mod P).

(2) One state indicates the presence or absence of any subframe for which ACK has been detected (within the UL TX Burst).

Thus, the UE may adjust a CWS on the basis of information indicated in L bits by the eNB as follows.

1) In the case where the eNB indicates a subframe for which ACK has been detected during a predetermined time period from a reception time of a UL grant (or DL grant), by L bits,
   A) When the UE has transmitted no UL TX Burst during the predetermined time period,
     1> If a retransmission for an HARQ process ID used for the first transmission subframe of a latest transmitted UL TX Burst is indicated to the UE, the UE may increase a CWS.
     2> If an initial transmission for the HARQ process ID used for the first transmission subframe of the latest transmitted UL TX Burst is indicated to the UE, the UE may reset (or maintain) the CWS.
   B) Else, the UE may maintain the CWS.

2) In the case where the eNB indicates to the UE, by L bits, a time offset of the first subframe for which ACK has been detected with respect to a subframe carrying a UL grant (or DL grant) (within the UL TX Burst) (or a subframe previous to the subframe carrying the UL grant (or DL grant) by M subframes),
   A) If the first subframe for which the eNB has detected ACK is earlier than the first transmission subframe of the latest transmitted UL TX Burst, the UE may maintain (or increase) the CWS.
   B) If the first subframe for which the eNB has detected ACK is later than the first transmission subframe of the latest transmitted UL TX Burst, the UE may increase the CWS.
   C) If the first subframe for which the eNB has detected ACK is identical to the first transmission subframe of the latest transmitted UL TX Burst, the UE may reset the CWS.

If the eNB indicates a subframe unscheduled for the UE as the first subframe for which the eNB has detected ACK, the UE may maintain (or increase) the CWS, ignoring the indication.

Specifically, in another method of receiving the decoding result (or HARQ-ACK result) of the first transmission subframe of a latest UL TX Burst transmitted by the UE from the eNB, the eNB may transmit absolute time-axis location information about the first subframe for which ACK has been detected within the latest UL TX Burst from the perspective of scheduling, and the UE may determine on the basis of the information whether the eNB has identified the first transmission subframe of the UL TX Burst transmitted by the UE, and whether the eNB has detected ACK for the subframe.

In a specific method, the eNB may indicate position information about the first subframe for which ACK has been detected in the latest UL TX Burst as a time offset from a subframe carrying a UL grant (or DL grant) by L-bit information in the UL grant (or DL grant). For example, if the subframe carrying the UL grant is an $n^{th}$ subframe, the eNB may indicate to the UE that the first subframe for which ACK has been detected in the latest UL TX Burst is an $(n-k)^{th}$ subframe by some bits of the UL grant.

However, the range of positions indicated for the first subframe for which ACK has been detected by the eNB may be limited by a bit width (or the number of bits) in the UL grant (or DL grant), which is to be allocated to represent corresponding information. For example, if 3-bit information is used to represent the information, and the subframe carrying the UL grant (or DL grant) is an $n^{th}$ subframe, the eNB may indicate, by one state, the absence of any subframe for which ACK has been detected during a predetermined time period from the reception time of the UL grant (or DL grant), and indicate, by 7 states ($=2^3-1$), that the first ACK has been detected for one of $(n-5)^{th}$, $(n-6)^{th}$, ..., $(n-12)^{th}$ subframes in the latest UL TX Burst.

In the present invention, therefore, it is proposed that if the eNB indicates the absence of any subframe for which ACK has been detected during a predetermined time period previous to a reception time of a UL grant (or DL grant), the UE may additionally check NDI information for an HARQ process index used for the first transmission subframe of a latest UL TX Burst transmitted by the UE, and particularly if the NDI information exists and indicates a retransmission, the UE may increases a CWS, determining that the eNB has failed in detecting the first transmission subframe of a previous UL TX Burst.

3.2.4. Fourth UE-Based CWS Adjustment Method

In the case where the eNB transmits a direct indication for a CWS (e.g., CWS reset or increase) to the UE or the UE autonomously adjusts a CWS and is capable of receiving information required for CWS adjustment, if the UE does not perform a UL transmission (or PUSCH transmission) during a predetermined time $T_0$ and then a UL transmission is indicated again to the UE, the UE may maintain a previous CWS or apply a minimum CWS, ignoring the CWS indication or information received from the eNB.

$T_0$ may be a preset value or a value configured by higher-layer signaling of the eNB.

In a specific example, on the assumption that the UE has been in DRX mode for a few seconds for the purpose of battery saving or the like, the UE may not receive a UL grant during the period, and thus no UL transmission takes place for the few seconds. Subsequently, if a UL transmission such as a PUSCH transmission is indicated again to the UE, the eNB may transmit a direct indication for CWS adjustment or information helpful for CWS adjustment to the UE on the basis of the decoding result of a PUSCH transmitted the few seconds earlier by the UE. The CWS adjustment indication or information determined on the basis of the decoding result of a UL subframe (or PUSCH) transmitted a long time ago is not favorable because it is not suitable for a current channel state in an unlicensed band which changes relatively fast due to occasional transmissions.

Therefore, the present invention proposes a method of, when a UE does not perform a UL transmission for a long time, maintaining a previous CWS or applying a minimum CWS, ignoring an indication or information about a CWS from an eNB.

Additionally, if the UE has received scheduling information about a latest scheduled UL TX Burst, but has failed in transmitting all subframes in the UL TX Burst, the UE may maintain a CWS for the next UL TX Burst transmission, ignoring the CWS-related indication or information from the eNB.

Additionally, the UE may adjust a CWS by using a CWS indication or information for CWS adjustment received from the eNB in a UL grant for the first scheduled subframe or the actual first transmission subframe of a scheduled UL TX Burst according to the foregoing various methods (the first and second eNB-based CWS adjustment methods, and the first to fourth UE-based CWS adjustment methods).

3.2.5. Fifth UE-Based CWS Adjustment Method

If a retransmission for an HARQ process ID used in the first transmission subframe of a latest transmitted UL TX Burst is indicated to the UE, the UE may increase a CWS, whereas an initial transmission for the HARQ process ID used in the first transmission subframe of the latest transmitted UL TX Burst is indicated to the UE, the UE may reset the CWS. More specifically, the UE may operate as follows in this CWS adjustment method.

First, if the UE fails to receive information indicating an initial transmission or a retransmission for an HARQ process ID used in the first transmission subframe of a latest transmitted UL TX Burst during a predetermined time $T_0$, the UE may first increase a CWS. Subsequently, if the eNB indicates an initial transmission for the HARQ process ID to the UE, the UE may reset the CWS, and if the eNB indicates a retransmission for the HARQ process ID, the UE may maintain the CWS.

According to the present invention, in a method of autonomously adjusting a CWS by a UE, the UE may use an eNB indication of an initial transmission or a retransmission for an HARQ process ID used in the first transmission subframe of a latest transmitted UL TX Burst. Herein, the UE may regard the indication of an initial transmission for the HARQ process ID as ACK for the first transmission subframe of the latest transmitted UL TX Burst. On the contrary, the UE may regard the indication of a retransmission for the HARQ process ID as NACK for the first transmission subframe of the latest transmitted UL TX Burst.

However, the eNB may arbitrarily set a time when the eNB indicates an initial transmission or a retransmission for the HARQ process ID used in the first transmission subframe of the latest transmitted UL TX Burst. Thus, a time delay until the UE receives corresponding information may be long according to an embodiment. In this case, the UE may have to transmit new UL data (e.g., PUSCH) in an uncertain state in which collision may already have occurred before the UE receives information for CWS adjustment.

In consideration of the above situation, if the eNB does not indicate an initial transmission or a retransmission for the HARQ process ID used in the first transmission subframe of a previous transmitted UL TX Burst during a predetermined time, the UE may first increase a CWS, and then upon receipt of corresponding information from the eNB, readjust the CWS. However, since the UE has already increased the CWS, even though the eNB indicates a retransmission for the HARQ process ID, the UE may maintain the CWS without a need for increasing the CWS.

As described before, the present invention proposes the eNB-based or UE-based CWS adjustment methods as a technique of adjusting a CWS for UL LBT. Among the CWS adjustment methods, the second UE-based CWS adjustment method in section 3.2.2. and the third UE-based CWS adjustment method in section 3.2.3. will be described below in greater detail.

First, the UE receives in a first subframe, from the eNB, a DL control signal indicating the position of the first successfully received subframe of a UL signal transmitted in an unlicensed band within a predetermined number of subframes from the first subframe, or the absence of any successfully received subframe of the UL signal.

The DL control signal may be configured to indicate the presence or absence of any successfully received subframe (e.g., an ACK subframe) of the UL signal transmitted in the unlicensed band within the predetermined number of subframes from the first subframe by information of one of M bits (M is a natural number larger than 1), and in the presence of any successfully received subframe of the UL signal transmitted in the unlicensed band within the predetermined number of subframes from the first subframe, to indicate the position of the first successfully received subframe of the UL signal by information of M−1 bits out of the M bits.

In the presence of any successfully received subframe of the UL signal transmitted in the unlicensed band within the predetermined number of subframes from the first subframe, the DL control signal may indicate a value obtained by applying a modulo operation to the index of the first successfully received subframe of the UL signal by the information of the M−1 bits out of the M bits.

The DL control signal may be a DL control signal for a DL assignment or a UL grant.

Subsequently, the UE adjusts a CWS for UL LBT on the basis of the information indicated by the received DL control signal, and the position of the first subframe of a latest UL TX Burst transmitted in the unlicensed band by the UE.

For example, in the absence of any successfully received subframe of the UL signal transmitted in the unlicensed band within the predetermined number of subframes from the first subframe, the CWS adjustment for the UL LBT may include increasing a CWS for the UL LBT.

In another example, in the presence of any successfully received subframe of the UL signal transmitted in the unlicensed band within the predetermined number of subframes from the first subframe, if the first successfully received subframe of the UL signal transmitted in the unlicensed band within the predetermined number of subframes from the first subframe is identical to the first subframe of the latest UL TX Burst transmitted in the unlicensed band by the UE, the CWS adjustment for the UL LBT may include resetting the CWS for the UL LBT, and if the first successfully received subframe of the UL signal transmitted in the unlicensed band within the predetermined number of subframes from the first subframe is different from the first subframe of the latest UL TX Burst transmitted in the unlicensed band by the UE, the CWS adjustment for the UL LBT may include increasing the CWS for the UL LBT.

In another example, in the absence of any successfully received subframe of the UL signal transmitted in the unlicensed band within the predetermined number of subframes from the first subframe, if there is no UL TX Burst transmitted in the unlicensed band within the predetermined number of subframes from the first subframe, and a retransmission for an HARQ process ID applied to the first subframe of the latest UL TX Burst transmitted in the unlicensed band by the UE is indicated to the UE, the CWS adjustment for the UL LBT may include increasing the CWS for the UL LBT, and if there is no UL TX Burst transmitted in the unlicensed band within the predetermined number of subframes from the first subframe, and an initial transmission for the HARQ process ID applied to the first subframe of the latest UL TX Burst transmitted in the unlicensed band by the UE is indicated to the UE, the CWS adjustment for the UL LBT may include resetting the CWS for the UL LBT.

The retransmission or initial transmission for the HARQ process ID may be indicated by an NDI, and the NDI may be included in the DL control signal.

In another example, the CWS adjustment of the UE for the UL LBT may include resetting the CWS for the UL LBT to the minimum of CWSs included in a preset CWS set, or increasing the CWS to the next larger CWS in the preset CWS set.

Subsequently, the UE may perform UL LBT for a UL transmission in the unlicensed band on the basis of the adjusted CWS, and perform the UL transmission in the unlicensed band on the basis of the result of the LBT.

Since examples of the above proposed methods may be included as one of methods of implementing the present invention, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB.

4. Device Configuration

Figure 16:
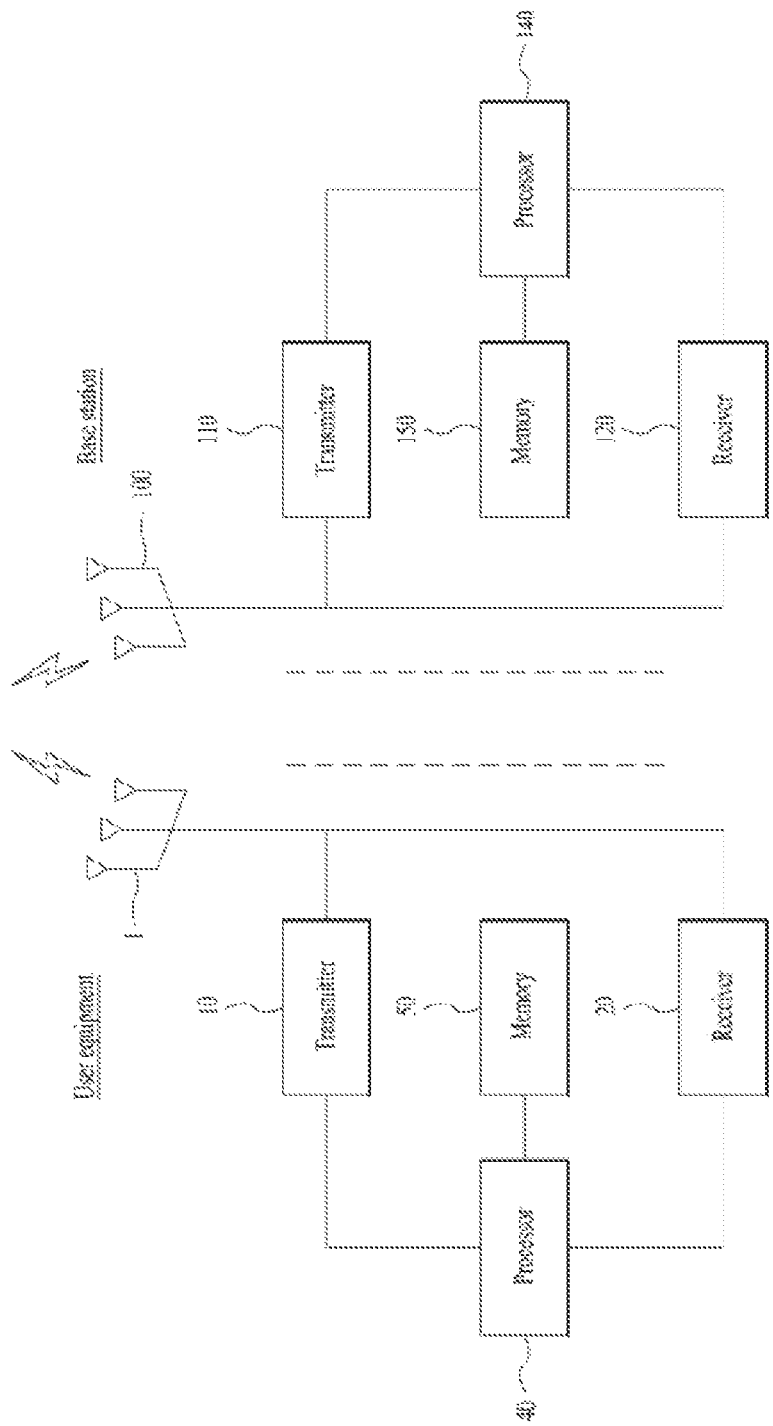
FIG. 16 is a block diagram illustrating a UE and a BS for implementing the proposed embodiments.

FIG. 16 is a diagram illustrating configurations of a UE and a base station capable of being implemented by the embodiments proposed in the present invention. The UE illustrated in FIG. 16 operates to implement embodiments of the afore-described CWS adjustment methods for UL LBT.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 having the above configuration may receive, from the base station 100 through the Rx 20, a DL control signal indicating the position of the first successfully received subframe of a UL signal transmitted in an unlicensed band within a predetermined number of subframes from a specific subframe, or indicating the absence of any successfully received subframe of the UL signal, in the specific subframe, adjust a CWS for UL LBT through the processor 40 on the basis of the information indicated by the received DL control signal and the position of the first subframe of a latest UL TX Burst transmitted in the unlicensed band by the UE 1, perform UL LBT for a UL transmission in the unlicensed band on the basis of the adjusted CWS, and perform the UL transmission in the unlicensed band on the basis of the result of the UL LBT through the Tx 10.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 29 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of controlling a contention window size (CWS) for uplink listen-before-talk (LBT) by a user equipment (UE) in a wireless communication system supporting an unlicensed band, the method comprising:
receiving a downlink control signal in a first subframe from a base station (BS), the downlink control signal indicating the position of a first successfully received subframe of an uplink signal transmitted in an unlicensed band within a predetermined number of subframes from the first subframe, or the absence of any successfully received subframe of the uplink signal;
when uplink transmission in the unlicensed band is skipped during a predetermined time, maintaining a CWS for uplink LBT by ignoring the received downlink control signal; and
when the downlink control signal is re-received from the BS, performing uplink LBT for the uplink transmission in the unlicensed band on the basis of the maintained CWS, and performing the uplink transmission in the unlicensed band on the basis of a result of the uplink LBT.

2. The method according to claim 1, wherein the downlink control signal indicates the presence or absence of any successfully received subframe of the uplink signal transmitted in the unlicensed band within the predetermined number of subframes from the first subframe by information of one of M bits (M is a natural number larger than 1), and
wherein in the presence of any successfully received subframe of the uplink signal transmitted in the unlicensed band within the predetermined number of subframes from the first subframe, the position of the first successfully received subframe of the uplink signal transmitted in the unlicensed band within the predetermined number of subframes from the first subframe is indicated by information of (M−1) bits out of the M bits.

3. The method according to claim 2, wherein in the presence of any successfully received subframe of the uplink signal transmitted in the unlicensed band within the predetermined number of subframes from the first subframe, the downlink control signal indicates a value obtained by applying a modulo operation to an index of the first successfully received subframe of the uplink signal transmitted in the unlicensed band within the predetermined number of subframes from the first subframe by the information of the (M−1) bits out of the M bits.

4. The method according to claim 1, when the uplink transmission in the unlicensed band is scheduled to be performed during the predetermined time, adjusting a CWS for uplink LBT on the basis of information indicated by the received downlink control signal, and the position of a first subframe in a latest uplink transmission burst transmitted in the unlicensed band by the UE; and
performing uplink LBT for the uplink transmission in the unlicensed band on the basis of the adjusted CWS, and performing the uplink transmission in the unlicensed band on the basis of a result of the uplink LBT.

5. The method according to claim 4, wherein in the absence of any successfully received subframe of the uplink signal transmitted in the unlicensed band within the predetermined number of subframes from the first subframe, the adjustment of a CWS for uplink LBT comprises increasing the CWS for the uplink LBT.

6. The method according to claim 4, wherein in the presence of any successfully received subframe of the uplink signal transmitted in the unlicensed band within the predetermined number of subframes from the first subframe, the adjustment of a CWS for uplink LBT comprises:
if the first successfully received subframe of the uplink signal transmitted in the unlicensed band within the predetermined number of subframes from the first subframe is identical to the first subframe in the latest uplink transmission burst transmitted in the unlicensed band by the UE, resetting the CWS for the uplink LBT; and
if the first successfully received subframe of the uplink signal transmitted in the unlicensed band within the predetermined number of subframes from the first subframe is different from the first subframe in the latest uplink transmission burst transmitted in the unlicensed band by the UE, increasing the CWS for the uplink LBT.

7. The method according to claim 4, wherein in the absence of any successfully received subframe of the uplink signal transmitted in the unlicensed band within the predetermined number of subframes from the first subframe, the adjustment of a CWS for uplink LBT comprises:
if there is no uplink transmission burst transmitted in the unlicensed band within the predetermined number of subframes from the first subframe by the UE, and a retransmission for a hybrid automatic repeat request (HARQ) process identifier (ID) applied to the first subframe in the latest uplink transmission burst transmitted in the unlicensed band by the UE is indicated to the UE, increasing the CWS for the uplink LBT; and
if there is no uplink transmission burst transmitted in the unlicensed band within the predetermined number of subframes from the first subframe by the UE, and an initial transmission for the HARQ process ID applied to the first subframe in the latest uplink transmission burst transmitted in the unlicensed band by the UE is indicated to the UE, resetting the CWS for the uplink LBT.

8. The method according to claim 7, wherein the retransmission or the initial transmission for the HARQ process ID is indicated by a new data indicator (NDI), and the NDI is included in the downlink control signal.

9. The method according to claim 4, wherein the adjustment of the CWS for uplink LBT comprises resetting the CWS for the uplink LBT to a minimum of CWSs included in a preset CWS set, or increasing the CWS to a next larger CWS in the preset CWS set.

10. The method according to claim 1, wherein the downlink control signal is a downlink control signal for a downlink assignment or an uplink grant.

11. A user equipment (UE) for controlling a contention window size (CWS) for uplink listen-before-talk (LBT) in a wireless communication system supporting an unlicensed band, the UE comprising:
a transmitter;
a receiver; and
a processor operatively connected to the transmitter and the receiver,
wherein the processor is configured to:
receive a downlink control signal in a first subframe from a base station (BS), the downlink control signal indicating the position of a first successfully received subframe of an uplink signal transmitted in an unlicensed band within a predetermined number of subframes from the first subframe, or the absence of any successfully received subframe of the uplink signal,
when uplink transmission in the unlicensed band is skipped during a predetermined time, maintain a CWS for uplink LBT by ignoring the received downlink control signal, and
when the downlink control signal is re-received from the BS, perform uplink LBT for the uplink transmission in the unlicensed band on the basis of the maintained CWS, and performing the uplink transmission in the unlicensed band on the basis of a result of the uplink LBT.

12. The UE according to claim 11, wherein the downlink control signal indicates the presence or absence of any successfully received subframe of the uplink signal transmitted in the unlicensed band within the predetermined number of subframes from the first subframe by information of one of M bits (M is a natural number larger than 1), and
wherein in the presence of any successfully received subframe of the uplink signal transmitted in the unlicensed band within the predetermined number of subframes from the first subframe, the position of the first successfully received subframe of the uplink signal transmitted in the unlicensed band within the predetermined number of subframes from the first subframe is indicated by information of (M−1) bits out of the M bits.

13. The UE according to claim 12, wherein in the presence of any successfully received subframe of the uplink signal transmitted in the unlicensed band within the predetermined number of subframes from the first subframe, the downlink control signal indicates a value obtained by applying a modulo operation to an index of the first successfully received subframe of the uplink signal transmitted in the unlicensed band within the predetermined number of subframes from the first subframe by the information of the (M−1) bits out of the M bits.

14. The UE according to claim 11, when the uplink transmission in the unlicensed band is scheduled to be performed during the predetermined time, the processor is configured to:
adjust a CWS for uplink LBT on the basis of information indicated by the received downlink control signal, and the position of a first subframe in a latest uplink transmission burst transmitted in the unlicensed band by the UE; and
perform uplink LBT for an uplink transmission in the unlicensed band on the basis of the adjusted CWS, and performing the uplink transmission in the unlicensed band on the basis of a result of the uplink LBT.

15. The UE according to claim 14, wherein in the absence of any successfully received subframe of the uplink signal transmitted in the unlicensed band within the predetermined number of subframes from the first subframe, the adjustment of a CWS for uplink LBT comprises increasing the CWS for the uplink LBT.

16. The UE according to claim 14, wherein in the presence of any successfully received subframe of the uplink signal transmitted in the unlicensed band within the predetermined number of subframes from the first subframe, the adjustment of a CWS for uplink LBT comprises:
if the first successfully received subframe of the uplink signal transmitted in the unlicensed band within the predetermined number of subframes from the first subframe is identical to the first subframe in the latest uplink transmission burst transmitted in the unlicensed band by the UE, resetting the CWS for the uplink LBT; and
if the first successfully received subframe of the uplink signal transmitted in the unlicensed band within the predetermined number of subframes from the first subframe is different from the first subframe in the latest uplink transmission burst transmitted in the unlicensed band by the UE, increasing the CWS for the uplink LBT.

17. The UE according to claim 14, wherein in the absence of any successfully received subframe of the uplink signal transmitted in the unlicensed band within the predetermined number of subframes from the first subframe, the adjustment of a CWS for uplink LBT comprises:
if there is no uplink transmission burst transmitted in the unlicensed band within the predetermined number of subframes from the first subframe by the UE, and a retransmission for a hybrid automatic repeat request (HARQ) process identifier (ID) applied to the first subframe in the latest uplink transmission burst transmitted in the unlicensed band by the UE is indicated to the UE, increasing the CWS for the uplink LBT; and if there is no uplink transmission burst transmitted in the unlicensed band within the predetermined number of subframes from the first subframe by the UE, and an initial transmission for the HARQ process ID applied to the first subframe in the latest uplink transmission burst transmitted in the unlicensed band by the UE is indicated to the UE, resetting the CWS for the uplink LBT.

18. The UE according to claim 17, wherein the retransmission or the initial transmission for the HARQ process ID is indicated by a new data indicator (NDI) and the NDI is included in the downlink control signal.

19. The UE according to claim 14, wherein the adjustment of a CWS for uplink LBT comprises resetting the CWS for the uplink LBT to a minimum of CWSs included in a preset CWS set, or increasing the CWS to a next larger CWS in the preset CWS set.

20. The UE according to claim 11, wherein the downlink control signal is a downlink control signal for a downlink assignment or an uplink grant.

* * * * *